Aug. 7, 1928.

C. W. JOHNSON

METHOD OF MAKING BEARINGS

Original Filed April 16, 1925

1,679,772

*INVENTOR.*
Carl W. Johnson
BY
*ATTORNEYS.*

Patented Aug. 7, 1928.

1,679,772

UNITED STATES PATENT OFFICE.

CARL W. JOHNSON, OF SHAKER HEIGHTS, OHIO, ASSIGNOR TO THE CLEVELAND GRAPHITE BRONZE COMPANY, OF CLEVELAND, OHIO, A CORPORATION OF OHIO.

METHOD OF MAKING BEARINGS.

Original application filed April 16, 1925, Serial No. 23,532. Divided and this application filed January 3, 1927. Serial No. 158,785.

The present invention, relating as indicated to a bearing and method of making the same, is more particularly directed to the manufacture of a composite bearing structure adapted to receive a spherical element and to journal the same against slight movements, such, for example, as are found in ball and socket joints and the like. One of the principal objects of the invention is the provision of a composite bearing of this general type, in which the bearing surface may be formed of a bearing material, such for example, as brass, bronze or the like, while the supporting element for the bearing surface may be constructed of a very much less expensive, but stronger material, such as steel or the like. A further object of the invention is the provision of a method and means for permanently uniting the bearing surface to the supporting element in such a way that the two are permanently and securely locked together, and also in such a way that the bearing surface is intimately engaged with the supporting surface so that the strength of the supporting element is utilized to back up and support the relatively thin bearing material. A still further object of the invention is the provision of a composite bearing element of the general type described in which the bearing surface of a suitable bearing material is provided either with a series of recesses containing a relatively solid lubricating material, such for example as graphite or the like, or with a series of recesses which serve to collect fluid lubricant supplied either to the bearing surface or to the surface of the article which is being journaled, and retain this lubricant to insure against failure in case of a temporary stoppage of the supply. The present application is a division of my copending application Serial No. 23,532, filed April 16, 1925.

To the accomplishment of the foregoing and related ends, said invention, then, consists of the means hereinafter fully described and particularly pointed out in the claims; the annexed drawing and the following description setting forth in detail one approved method of carrying out the invention, such disclosed mode, however, constituting but one of the various ways in which the principle of the invention may be used.

In said annexed drawing:—

Figure 2:
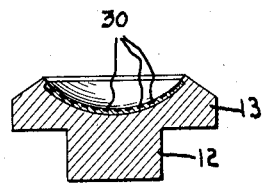
Figure 1:
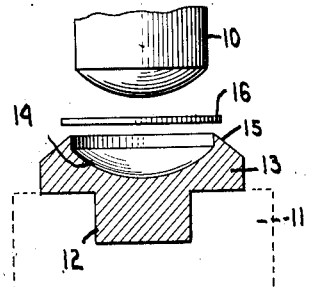
Figure 3:
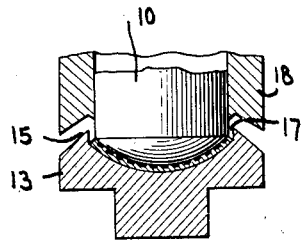

Fig. 1 is a transverse vertical section through the supporting element and the bearing element showing the same in position to be assembled in a press; Fig. 2 is a view of the finished bearing element; Fig. 3 is a view corresponding to Fig. 1, but showing means for spinning the upper rim of the supporting element over the edge of the bearing element to lock the same in place; and Fig. 4 is a longitudinal section of the same through a device illustrating the use of a bearing element of this type.

Figure 4:
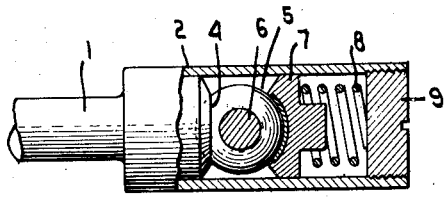

For the purpose of illustration I will first refer to Fig. 4, which shows the common use of a ball and socket connection. In this figure there is shown a rod 1 provided with a hollow socket 2. Mounted on the inner end of the socket member is a member 3, which is provided with a spherical surface 4 on its outer side, within which is received a ball end 5 of a second rod 6. The ball is retained in such engagement by a second socket member 7 maintained in position by means of a spring 8 and an adjustable plug 9 threaded into the outer end of the tube 2. It will be understood that in the view shown I have merely illustrated one form of limited universal connection in which the spherical socket members or bearing members may be employed.

The present invention has to do with an improved type of spherical socket member, which I have shown in Fig. 4, and the method of making same. My method consists, briefly stated, in first forming a socket member with a spherical surface, and then pressing into such surface a relatively thin sheet or strip of bearing material, and finally locking the two members in engagement.

In Fig. 1 I have shown diagrammatically apparatus for performing the second operation named, the apparatus consisting of a plunger 10, base 11 provided with an opening in which is received the shaft 12 of socket member 13, this member 13 having been previously formed with a spherical surface 14 and with an upstanding rim or edge 15 surrounding the spherical surface. I now mount on the outer edge of the member 13 a relatively thin circular disk 16 of some such material as brass or bronze in such a position that when the plunger 10 is depressed it will force this disk into spherical shape and will press the same firmly and intimately into engagement with the spherical surface 14 in the member 13. The surface 14 may, if desired, be roughened or made irregular in any suitable manner in order to provide a greater area of contact between the bearing sheet and the surface of this socket, and to also allow a greater intimacy of engagement between these two surfaces.

The article formed in the manner above described is shown in Fig. 3, and the next step in my method includes spinning or swaging the upstanding edge 15 of the socket member down and over the upper edge 17 of the bearing strip, which may be accomplished in various ways, such as I have illustrated in Fig. 3, in which a second plunger 18 is moved down about the first plunger 10 and acts to spin or flow the edge 15 inwardly to overlap the upper edge 17 of the bearing strip, thus reducing the finished article, which is shown in Fig. 2.

The present article is not only quite inexpensive to manufacture by the method I have described, but is also a very much better and longer lived bearing socket member for use against steel ball ends than is a steel socket member such as is now used.

As already indicated, the composite bearing which forms the present invention may, if desired, be provided with a series of recesses 30, which are shown in Figs. 2 and 3, and which are preliminarily formed in the disk 16 before the same is pressed in place in the socket member 13 and is formed into the required shape. These recesses 30 may if desired be filled with a suitable lubricating composition, such as graphite or the like, or may be left unfilled, in which case they act to collect material worn off from the bearing surfaces, together with any dirt, or if a liquid lubricant is supplied to contacting surfaces a certain amount of this lubricant collects in these recesses, which then serve as reservoirs of lubricant in the event of failure of a lubricant supply.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making a partly spherical bearing, the steps which consist in forming a plurality of lubricant-receiving pockets in a relatively thin sheet of bearing metal, pressing such sheet into a recess in an element and then deforming said element to engage and lock the edges of said sheet in place.

2. In a method of making a partly spherical bearing, the steps which consist in pressing a relatively thin flat sheet of bearing metal into a recess in an element and simultaneously deforming said sheet to force the same into engagement with the surface of said recess, and then deforming said element to engage and lock the edges of said sheet in place.

3. In a method of making a partly spherical bearing, the steps which consist in pressing a relatively thin flat sheet of bearing metal into a recess in an element and simultaneously deforming said sheet to force the same into engagement with the surface of said recess and to form a spherical outer surface on said sheet, and then flowing the adjacent edges of said element over the edges of said sheet to engage and lock the same in place.

4. In a method of making a partly spherical bearing, the steps which consist in pressing a relatively thin sheet of bearing metal into engagement with the scarified surface of a recess in an element and simultaneously deforming and flowing the metal of said sheet to produce a partly spherical outer surface on said sheet, and then holding said sheet in such engagement and flowing the adjacent edges of said element over the edges of said sheet to engage and lock the same in place.

Signed by me, this 27 day of December, 1926.

CARL W. JOHNSON.